United States Patent
Stucchi

[11] Patent Number: 5,855,227
[45] Date of Patent: Jan. 5, 1999

[54] QUICK-COUPLING FITTING FOR PIPES WITH AN IMPROVED SEAL

[75] Inventor: Giovanni Stucchi, Treviglio, Italy

[73] Assignee: Stucchi, s.r.l., Brignano Gera D'Adda, Italy

[21] Appl. No.: 650,992

[22] Filed: May 21, 1996

[30] Foreign Application Priority Data

May 26, 1995 [IT] Italy .................. MI95 A 1096

[51] Int. Cl.⁶ .................................................. F16K 37/28
[52] U.S. Cl. ........................ 137/614.03; 251/149.8; 251/356; 251/359
[58] Field of Search ............... 137/614.03; 251/149.8, 251/353, 356, 359

[56] References Cited

U.S. PATENT DOCUMENTS

| | | | |
|---|---|---|---|
| 2,263,581 | 11/1941 | Hughes | 251/356 |
| 4,086,939 | 5/1978 | Wilcox et al. | 137/614.03 |
| 4,289,164 | 9/1981 | Ekman | 137/614.03 |
| 4,892,117 | 1/1990 | Spalink et al. | 137/614.03 |
| 5,076,325 | 12/1991 | Ekman | 137/614.03 |
| 5,323,812 | 6/1994 | Wayne | 137/614.03 |

FOREIGN PATENT DOCUMENTS

| | | | |
|---|---|---|---|
| 0580223 | 1/1994 | European Pat. Off. | |
| 0580233 | 1/1994 | European Pat. Off. | |
| 1192022 | 10/1959 | France | |
| 1820606 | 8/1960 | Germany | |
| 1650223 | 8/1970 | Germany | 137/614.03 |
| 4114480 | 11/1991 | Germany | 137/614.03 |
| 0686800 | 5/1995 | Germany | |
| 182988 | 8/1966 | U.S.S.R. | 137/614.03 |

Primary Examiner—A. Michael Chambers
Attorney, Agent, or Firm—Sixbey, Friedman, Leedom & Ferguson; Gerald J. Ferguson, Jr.; Donald R. Studebaker

[57] ABSTRACT

A quick-coupling fitting for pipes comprises a female element and a male element that can be coupled together. The female element comprises parts that are fixed and parts that can slide between a closed position and an open position of a passage for fluids. The fixed parts comprise a stem having one end enlarged, and the slidable parts comprise a bush, coaxial with the stem, axially slidable and elastically urged towards the closed position. The bush defines with the stem a hollow space for the passage of the fluid. The bush is provided with a sharp-edged metal annular projection that, in the closed position, engages with a metal frustum-shaped surface of the enlarged end of the stem to provide a seal of said hollow space.

9 Claims, 4 Drawing Sheets

5,855,227

QUICK-COUPLING FITTING FOR PIPES WITH AN IMPROVED SEAL

DESCRIPTION

The present invention relates to a quick-coupling fitting for pipes with an improved seal.

In the transmission of fluids it is often necessary to have fittings available that can be mounted quickly to connect flexible or rigid pipes, in turn connected to a supply of fluid and to a utility.

Known quick-coupling fittings consist generally of two elements, male and female, mounted on respective pipes to be connected and that can be coupled by screwing-up or snap means.

According to a currently-known art, described in the European patent application No. 0580233 filed in the name of the same Applicant, the male element generally comprises an external body provided with means for coupling with the female element at one end, an internal body and an internally threaded nut at the other end for coupling to the supply or the utility. Inside said body, in a concentric position and so as to leave a hollow space, there is a piston urged by corresponding positioning springs in a position of frontally closing the hollow space itself.

The female element comprises an internal body inserted at one end in an internally threaded nut for coupling to the supply or the utility, and an external body coaxial with said internal body.

The internal body supports a valve element consisting of a fixed axial internal stem with one end enlarged. Externally to this, concentrically, there is mounted, so as to leave a hollow space a sealing bush that, under the elastic action of positioning springs and by means of the engagement of an annular gasket of rubber or plastic material (Teflon) housed in a respective seat on the enlarged end of the stem, prevents the passage of the fluid in the hollow space in the absence of a coupling with the male element.

Concentrically with and externally to the bush, there is a unit for cleaning the same consisting in a sliding cup with a corresponding positioning spring.

During the coupling action between the female element and the male element, the sliding cup of the female element is pushed by the external body of the male element and, during its translation, it moves the bush along with it against the urging force of the corresponding positoning spring. Simultaneously the piston of the male element is urged to return inside the external body of the same male element against the force of the corresponding positioning spring, up to a position where the hollow space is open.

The problem afflicting the known fittings resides in the fact that the annular gasket that, under the conditions wherein the fitting is not coupled up, should ensure the seal in the female element usually co-operates with the internal surface of the bush: the engagement between the annular gasket and the bush is thus lateral and not frontal, which does not ensure a perfect seal. Moreover, the relative sliding movement of the bush with respect to the gasket during the coupling and the uncoupling action with the male element determines the wear of the gasket, and thus a drop in the effectivenss of the seal as time goes by.

Wear is even more marked and can even lead to the breakage and/or to the displacement of the gasket outside its seat if, as sometimes occurs, the gasket and its seat are not conformed so as to make an engagement that is also frontal between bush and gasket.

In view of the state of the art described, the object of the present invention is that of providing a quick-coupling fitting for pipes that is not subject to the abovementioned sealing problems.

According to the present invention, such object is attained thanks to a quick-coupling fitting for pipes comprising a female element and a male element that can be coupled together, said female element comprising parts that are fixed and parts that can slide between a closed position and an open position of a passage for fluids, said fixed parts comprising a stem having one end enlarged and said slidable parts comprising a bush, coaxial with said stem, axially slidable and elastically urged towards said closed position, said bush defining with said stem a hollow space for the passage of the fluid, characterized in that said bush is provided with a sharp-edged metal annular projection that, in said closed position, engages with a metal frustum-shaped surface of the enlarged end of said stem to provide a seal of said hollow space.

In a preferred embodiment, said stem and said bush are made of metal materials having different hardnesses, the metal material of which the bush is formed having preferably a lower hardness than the hardness of the metal material from which the stem is formed.

In the fitting according to the present invention, the seal in the female element, under conditions of uncoupling from the male element, is not made by means of a gasket of rubber or of plastic material, but, rather, thanks to the edge-type (head-on) engagement of two metal surfaces. This type of seal does not deteriorate over time, because even if the annular projection of the bush were to lose, due to the wear of material, its edges, its engagement with the frustum-shaped surface of the enlarged end of the stem would in any case not be reduced.

These and other features and advantages of the present invention will be made more evident by the following detailed description of two embodiments thereof, illustrated as non-limiting examples in the enclosed drawings, wherein.

Figure 1:
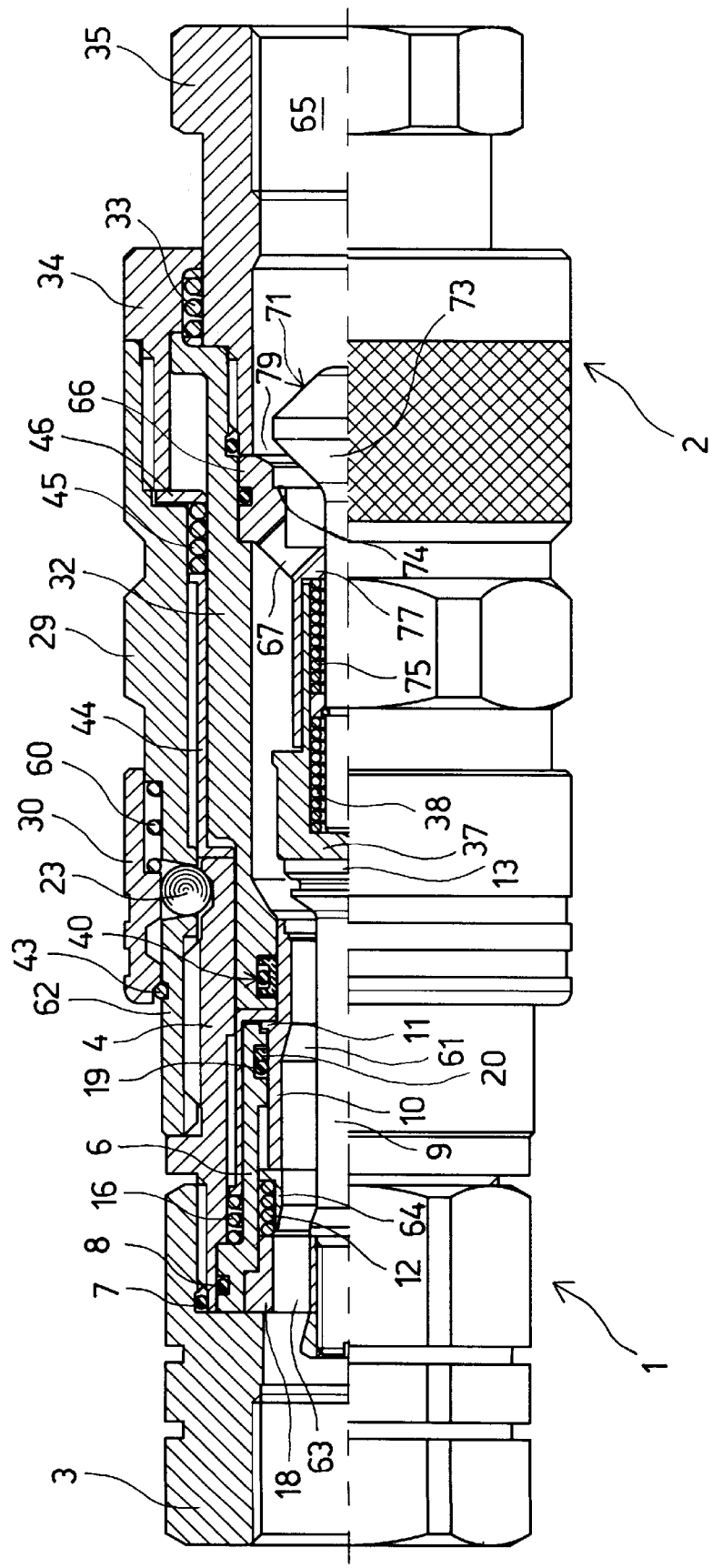
FIG. 1 is a front view, partially in a longitudinal cross-section, of a female element and of a male element of a fitting according to the invention, under conditions of coupling.

With reference to FIG. 1, the quick-coupling fitting according to the invention consists in a known way of a female element 1 and of a male element 2.

Figure 2:
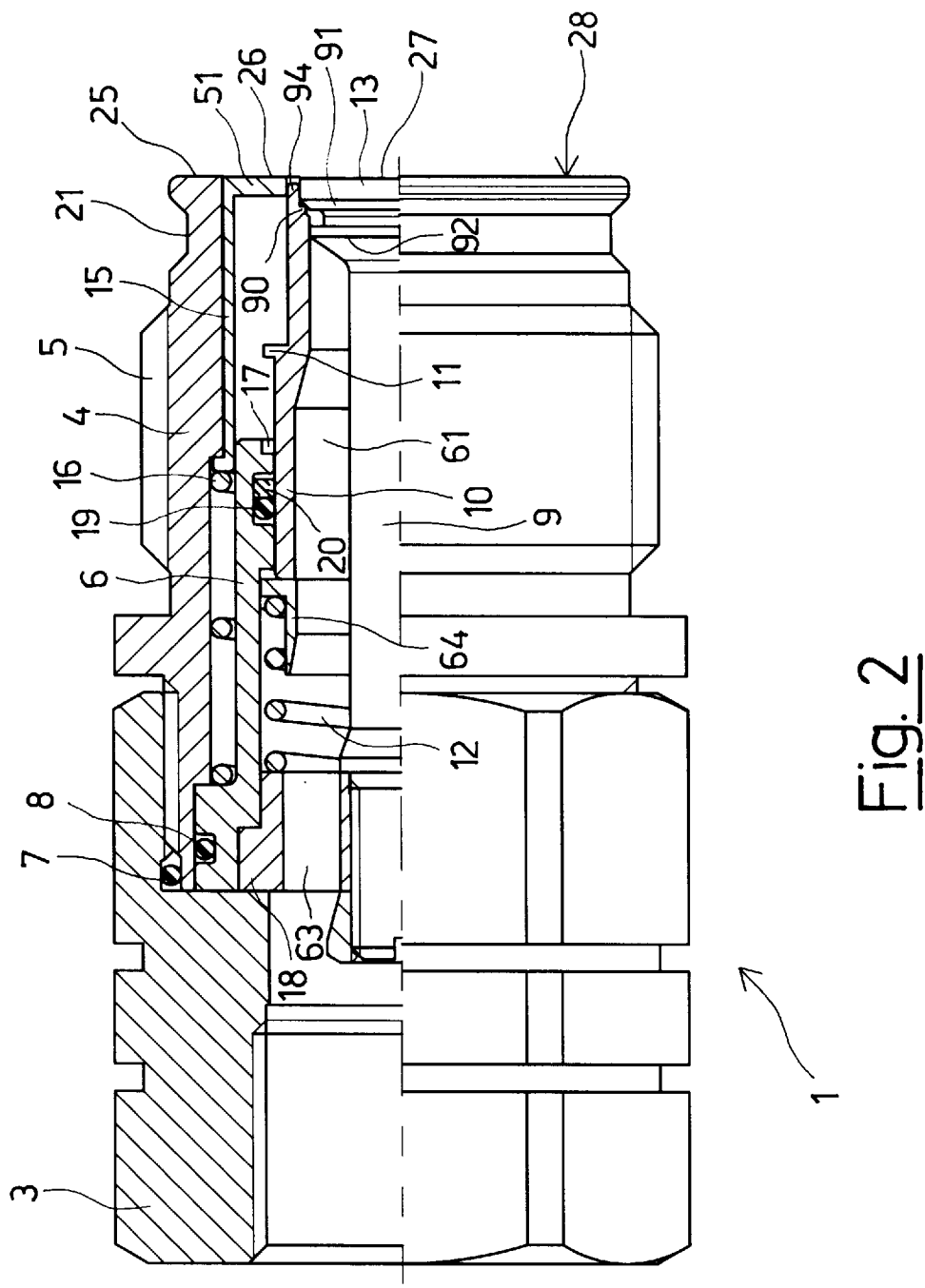
FIG. 2 is a front view, partially in a longitudinal cross-section, of the female element of the fitting of FIG. 1, under conditions of uncoupling from the male element.

The female element 1, visible on an enlarged scale in FIG. 2 under conditions of uncoupling from the male element 2, comprises, rigidly clamped together, a nut 3 provided with an internal thread for connecting to a fluid supply or to a utility, an external body 4 screwed into said nut 3 at one end, a fixed annular base 18 having several ports 63 through it for the passage of the fluid and an internal body 6 arranged concentrically with respect to the external body 4. The perfect seal between said external body 4 and said nut 3 is ensured by an annular gasket (O-ring) 7.

The annular base 18 supports a fixed axial internal stem 9. Externally to and concentrically with the stem 9, so as to leave a hollow space 61, there is an axially-slidable sealing bush 10, provided with protruding elements 11; under conditions at rest, with the fitting open (FIG. 2), said sealing bush 10 is urged, in an axial direction, by a spring 12 that pushes said bush 10 toward the right, through a sleeve 64.

Figure 4:
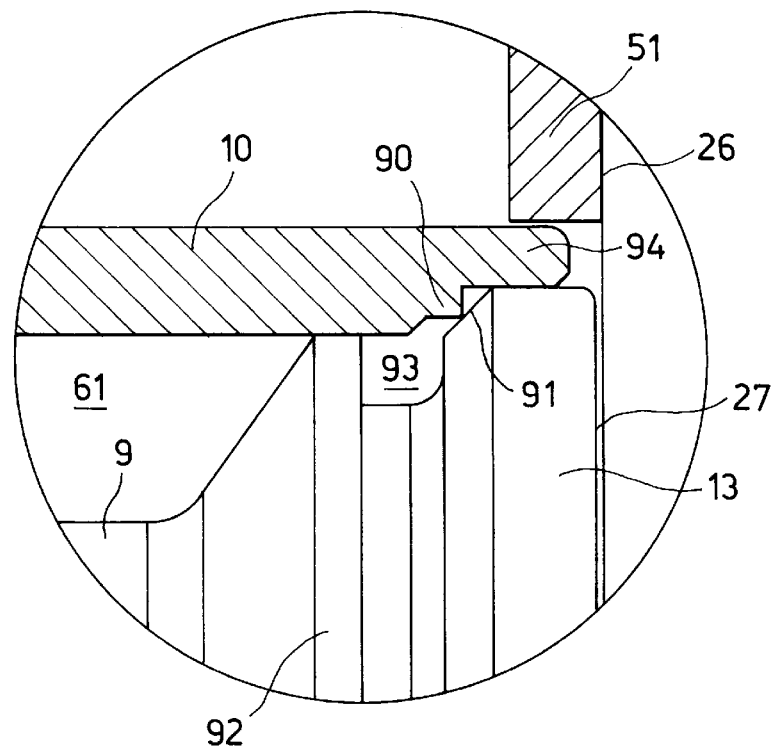
FIG. 4 is a view on a greatly-enlarged scale of a detail of the female element of the fitting, in a first embodiment of the present invention.

As can be seen better in FIG. 4, the bush 10 is provided with a sharp-edged annular projection 90 that, in the condition at rest with the fitting open, engages under the thrust of the spring 12 with a frustum-shaped surface 91 on an enlarged end 13 of the stem 9. The stem 9 is also provided with a collar 92 having a diameter substantially equal to the internal diameter of the bush 10 and that co-operates with the latter to close the hollow space 61. The collar 92, together with the enlarged end 13, defines an annular chamber 93.

The engagement of the annular projection 90 with the frustum-shaped surface 91 ensures the seal against the fluid that may possibly seep between the bush 10 and the collar 92 of the stem 9. Moreover, the annular chamber 93 creates a labyrinth-type path for the fluid that contributes in improving the seal.

Preferably, the bush 10 consists of a metallic material having a hardness that is lower than that of the metallic material constituting the stem 9, so as to reduce the loss over time of the sharpness of the edge due to the wear of the material. It is, however, as well to point out that even were such a loss of sharpness to take place, the sealing action would not be in any way impaired.

The annular projection 90, as well as the frustum-shaped surface 91, can even not be integral with the bush 10 and with the stem 9, respectively, as they can be formed by the insertion of some material. In this case it is preferable for the inserted material forming the annular projection 90 to have a greater hardness than that of the inserted material constituting the frustum-shaped surface 91.

Concentrically with and externally to the sealing bush 10 and inside the external body 4, there is a unit for cleaning the bush itself, formed by a cup 15, provided with a transversal terminal element 51, axially slidable on the external surface of said internal body 6 and urged by a positioning spring 16. As can be seen better in FIG. 4, one end 94 of the bush 10 is inserted in a hollow space between the transversal element 51 and the enlarged end of the stem 9.

The internal body 6, in which cavities 17 for receiving the protruding elements 11 of the sealing bush 10 are obtained, has a surface in contact with the external body 4 provided with a gasket 8 and a surface in contact with said sealing bush 10 provided with a further gasket 19 and an antiextrusion device 20.

The external body 4 has, at the end that couples up with the male element 2, an external thread 5. It also has, again on its external surface, an annular hollow space 21 for receiving a circumferential succession of balls 23 supported by the male element 2 (FIGS. 1 and 3).

The terminal surfaces 25, 26 and 27 of the external body 4, of the cup 15 and of the axial stem 9, respectively, (FIG. 2) are arranged so as to form substantially a plane surface indicated as a whole with 28. The end 94 of the bush 10 is, on the other hand, slightly further back with respect to the plane surface 28 to avoid that it be exposed to damage such as burrs, bends or such like, that would risk compromising the sealed closing of the hollow space 61.

Figure 3:
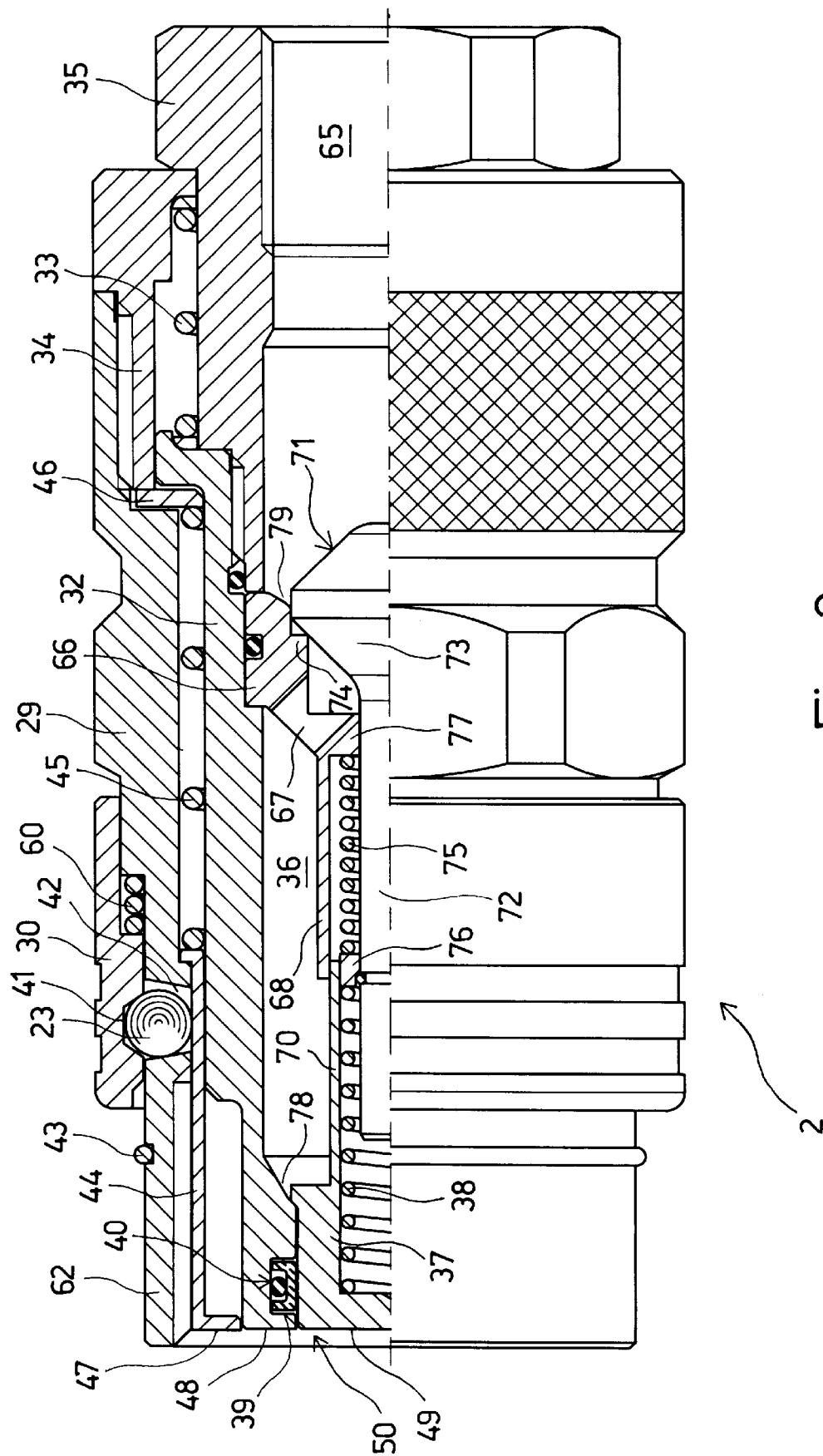
FIG. 3 is a front view, partially in a longitudinal cross-section, of the male element of the fitting of FIG. 1, under conditions of uncoupling from the female element.

The male connecting element 2, shown on an enlarged scale and in the condition of uncoupling in FIG. 3, is of the type described in the Italian patent application No. MI94A001190 filed on Jun. 8, 1994 in the name of the same applicant. It comprises an external body 29, an internal body 32 arranged concentrically to said external body 29, a terminal nut 35 screwed into the internal body 32, provided with a conduit 65 for connecting to a supply or a utility, and a supporting element 34, screwed into the external body 29 and slidable over the external surface of the terminal nut 35 under the action of a spring 33.

Inside the internal body 32 there is a frustum-shaped shoulder 66, with several ports 67 through it for the passage of the fluid and provided with a tubular projection 68. The tubular projection 68 of the shoulder 66 and the internal body 32, that constitute fixed parts of the male element 2, define inside them a hollow space 36 for the passage of the fluid, in which there is housed a piston 37 urged by a spring 38 in an axial direction toward the left. The seal between the internal body 32 and the piston 37 is ensured by a gasket 40, formed by an elastic ring and by an O-ring, that is housed in an annular seat 39 of the body 32. The seat 39 is in the proximity of an end surface 48 that during the coupling action of the fitting, is in a position facing the terminal surface 26 of the cup 15. The piston 37 remains in contact with the internal body 32 so as to close an opening port 78 of the hollow space 36. The piston 37 has a skirt 70 that is supported in an axially slidable manner in the tubular projection 68.

Coaxially with the skirt 70 there is a mushroom valve 71 provided with a stem 72 and with a head 73, that in the position shown in FIG. 3, and in a manner similar to that described with reference to the female element 1, provides the seal with the shoulder 66 thanks to the engagement of a sharp-edged annular projection 74 of the shoulder 66 with a frustum-shaped surface of a head 73 of the mushroom valve 71. The valve 71 is kept in the condition of engagement with the sharp-edged projection 74 of the shoulder 66 by a spring 75, so as to close a passage port 79 between the conduit 65 and the hollow space 36. The spring 75 is placed between a collar 76 fastened to the stem 72 and an opposite wall 77 of the tubular element 68. The spring 38 urging the piston 37 is also engaged with the collar 76 of the stem 75.

As in the case of the female element 1, the frustum-shaped shoulder 66 (or at least the sharp-edged projection 74, if this is inserted instead of being integral) is preferably made in a metallic material having a hardness greater than that of the material of which the valve 71 is formed.

In the hollow space between the external body 29 and the internal body 32 there is a cup 44 urged by a positioning spring 48 reacting against a ring 46 held between the external body 29 and the supporting element 34.

The external body 29 has an internally-threaded terminal portion 62. In a position further back, it also supports a ring nut 30, provided with a positioning spring 60 and slidable on the external surface of said terminal portion 62 of the external body 29. In the proximity of the ring nut 30 the terminal portion 62 has externally an elastic ring 43, whose functions will appear clear later.

On the internal surface the ring nut 30 has an annular notch 41 suitable for defining, in the position at rest represented in FIG. 3 and jointly with a corresponding succession of holes 42 of the external body 29, respective cavities for receiving the balls 23 for fastening said male element 2 and female element 1.

The terminal surfaces 47, 48 and 49 of the cup 44, of the internal body 32 and of the piston 37, respectively, are arranged so as to form substantially a plane surface indicated as a whole with 50.

The coupling action of the two male element 2 and female element 1 of the fitting takes place as follows.

The coupling action of the fitting starts with the elements 1 and 2 being brought together so as to put the respective surfaces 28 and 50 in contact. In particular, the surface 27 of the enlarged end 13 of the stem 9 is put in contact with the surface 49 of the piston 37, the surface 26 of the terminal element 51 of the cup 15 is put in contact with the terminal surface 48 of the internal body 32 of the male element 2 and lastly the surface 25 of the external body 4 is put in contact with the surface 47 of the cup 44.

The first step of the coupling action is then performed by starting to screw up the threaded terminal portion 62 of the external body 29 of the male element 2 on the corresponding threaded portion 5 of the external body 4 of the female element 1. Such screwing up causes in the first place the displacement toward the left, with respect to the position at rest, of the external body 29, slidable on the internal body 32, and of the support 34, slidable on the nut 35. The displacement of the support 34 produces a compression of the spring 33 and, at the same time, it involves in the displacement the ring 46 that urges the spring 45 in compression.

During this first step the passage of the liquid inside the fitting is prevented since the hollow space 61 of the female element 1 is closed due to the engagement between the bush 10 and the collar 92 and the enlarged end 13 of the stem 9, the hollow space 36 of the male element 2 is closed by the piston 37 and the conduit 65 is closed by the valve 71.

The second step of the coupling action consists in the continuation of the screwing-up operations.

The external body 29 and its terminal portion 62 continue to advance toward the left. When the spring 33 reaches its position of maximum compression the support 34 is made perfectly integral with the internal body 32, that is as a consequence pushed toward the left, against the action of the spring 16 that urges the cup 15 of the female element 1 in contact with said body 32. The cup 15 moves toward the left, getting nearer to the protruding elements 11 of the bush 10, and the spring 16 is, thus, compressed as a result of the displacement of the cup 15.

The internal body 32 of the male element 22, moving toward the left, disengages itself from the piston 37 and engages itself with the bush 10 of the female element 1 bringing the sealing gasket 40 in contact with the bush itself. Since the seat 39 is at a highly limited distance from the end wall of the body 32, with a small axial displacement of the body 32 the gasket 40 is already covered and protected by the bush 10 even during the initial steps of screwing up the fitting. The bush 10, through the engagement with the collar 92 of the stem 9, continues to maintain the hollow space 61 of the female element 1 closed.

The relative displacement of the internal body 32 with respect to the stem 9 of the female element 1, that remains fixed together with its enlarged end 13, brings the piston 37 to assume a position further inside the male element 2, with the consequent compression of the corresponding positioning spring 38, while the valve 71, in case of pressure of the fluid present in the conduit 65, continues to maintain closed the communication port 79 between conduit 65 and hollow space 36.

At the same time the cup 44 of the male element 2, kept in contact with the external body 4 of the female element 1, determines a further compression of the spring 45.

The third step of the coupling action consists in the further screwing-up of the element 2 on the element 1.

The piston 37, due to the relative displacement toward the left of the external body 29 with respect to the internal body 32, is further back with respect to the internal body 32, with the consequent further compression of the positioning spring 38. Before the passage port 78 starts to open, the piston 37 comes into contact with the stem 72 of the valve 71 and pushes it toward the right; the displacement of the valve 71 determines the compression of the spring 75 through the projection 76. The valve 71 thus starts to open the communication port 79 between conduit 65 and hollow space 36, after which the passage port 78 also opens.

The last step of the coupling action of the fitting consists in finishing the operations of screwing up the external body 29 on the external body 4, which brings the external body 32 to push toward the left the cup 15 against the action of the spring 16. The body 32, through the structure 51 and the protruding elements 11, drives the bush 10 to displace itself toward the left. Such displacement has as a consequence the complete opening of the passage port 78 between the hollow space 36 and the hollow space 61.

Moreover, the last step of the screwing-up action of the external body 29 brings the piston 37 to push toward the right the stem 72 of the valve 71, opening completely the communication port 79 as well. Since the passage port 78 and the communication port 79 are open at the same time, the fluid can flow through the entire fitting from the conduit 65 to the hollow space 61.

One consequence of such further screwing-up action consists in attaining the maximum compression of the spring 45, urged by the cup 44 that is pushed toward the right with respect to the displacement toward the left of the internal body 32 of the male element 2. In this position the external body 29 and the internal body 32 of the male element 2 are displaced toward the left by an amount such as to allow the balls 32 to be arranged opposite the annular receiving hollow space 21 of the external body 4 of the female element 1. The balls 23 come out of the annular notch 41 of the ring nut 30 and penetrate inside the annular hollow space 21, with the consequent positioning of the balls 23 at a radial distance that is smaller than that of the previous position. In such new position, thus, the balls 23 no longer obstruct the relative motion of the ring nut 30 with respect to the terminal portion 62 of the external body 29; as a consequence the spring 60, no longer constrained by the presence of the balls 23, urges the ring nut itself to slide along the terminal portion 62 until it reaches the elastic ring 43 that blocks a further possible movement toward the left of said ring nut; this thus remains in a position of equilibrium, blocking the balls 23 inside the hollow space 21. Such positioning of the ring nut 30 thus allows the fitting to be clamped completely in the coupled position and completes the operation of assemblying the fitting itself (FIG. 1).

Figure 5:
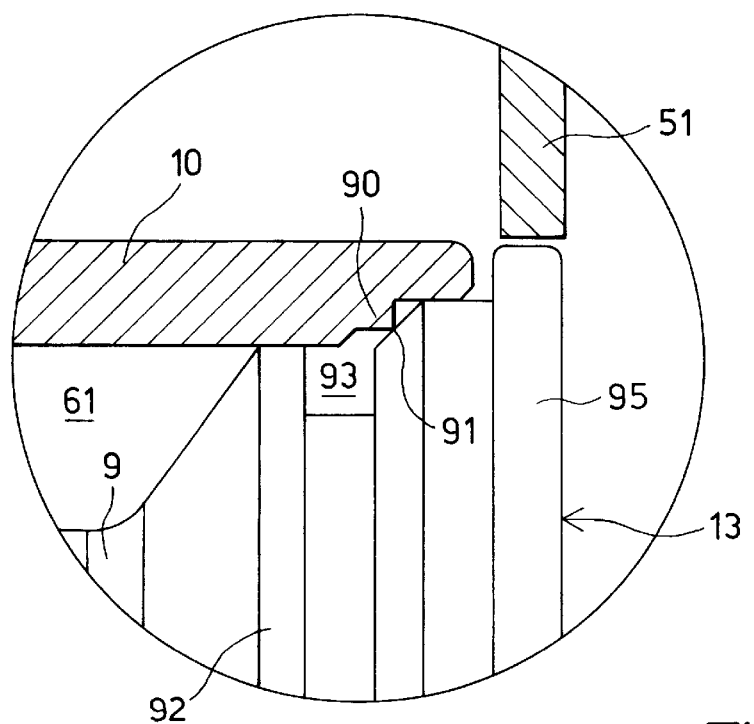
FIG. 5 shows, on a greatly-enlarged scale, the same detail of FIG. 4 but in a second embodiment of the invention.

FIG. 5 shows the same detail shown in FIG. 4, but in a different embodiment of the invention. As opposed to the previous embodiment, the end 94 of the bush 10 is protected by a frontal disc 95 in the front part of the enlarged end 13 of the stem 9. In this way such end 94 of the bush 10 is not exposed to accidental damage, derived for example by an incorrect centering of the male element with respect to the female element during the coupling action.

In the previous description reference has been made to a fitting wherein the mate and female elements are coupled by screwing up. The invention is, however, also directly applicable to fittings wherein the male and female elements can be coupled by snap-on means.

I claim:

1. A quick-coupling fitting for pipes comprising a female element and a male element that can be coupled together, said female element comprising parts that are fixed and parts that can slide between a closed position and an open position of a passage for fluids, said fixed parts comprising a stem having one end enlarged and said slidable parts comprising a bush, coaxial with said stem, axially slidable and elastically urged towards said closed position, said bush defining with said stem a hollow space for the passage of the fluid, characterized in that said bush is provided with a sharp-edged metal annular projection that, in said closed position, engages with a metal frustum-shaped surface of the enlarged end of said stem to provide a seal of said hollow space.

2. A fitting according to claim 1, characterized in that said sharp-edged annular projection is made of a material having a hardness that is lower than the hardness of the material constituting said frustum-shaped surface.

3. A fitting according to claim 1 or 2, characterized in that said sharp-edged annular projection and said frustum-shaped surface are integral with the bush and with the stem, respectively.

4. A fitting according to claim 1 or 2, characterized in that said sharp-edged annular projection and said frustum-shaped surface are constituted by inserted material.

5. A fitting according to claim 1, characterized in that said stem is provided with a collar having a diameter substantially coincident with the internal diameter of said bush, in order to contribute in closing said hollow space.

6. A fitting according to claim 1, characterized in that said sliding parts of the female element also comprise a cup sliding axially to said bush and provided with a terminal element extending in a radial direction to form, together with said enlarged end of the stem, a substantially plane surface.

7. A fitting according to claim 6, characterized in that said bush has one end inserted in a hollow space between said terminal element and said enlarged end of the stem.

8. A fitting according to claim 6, characterized in that said enlarged end of the stem comprises a disc having a diameter sufficient to protect said end of the bush.

9. A quick-coupling fitting for pipes, comprising a female element and a male element, said male element comprising valve means suitable for cutting-off a supply conduit of fluid at a passage port of the fluid between the male element and the female element in initial steps of said coupling action and suitable for opening a communication port between said conduit and said passage port in final steps of said coupling action, characterized in that said valve means consist of a mushroom valve sliding between a closed position and an open position of said communication port, said valve comprising a metallic stem and head having a frustrum-shaped surface that, in the closed position, co-operates with a metallic sharp-edged annular projection of a body coaxially arranged around said valve to make a metal-to-metal seal.

* * * * *